(12) United States Patent
Inui et al.

(10) Patent No.: US 9,241,119 B2
(45) Date of Patent: Jan. 19, 2016

(54) IMAGE PICKUP APPARATUS, METHOD OF DRIVING IMAGE PICKUP APPARATUS, AND IMAGE PICKUP SYSTEM

(71) Applicant: CANON KABUSHIKI KAISHA, Tokyo (JP)

(72) Inventors: Fumihiro Inui, Yokohama (JP); Junji Iwata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 14/032,517

(22) Filed: Sep. 20, 2013

(65) Prior Publication Data

US 2014/0085521 A1 Mar. 27, 2014

(30) Foreign Application Priority Data

Sep. 24, 2012 (JP) .................................. 2012-209492

(51) Int. Cl.
*H04N 5/3745* (2011.01)
*H04N 5/355* (2011.01)
*H04N 5/374* (2011.01)

(52) U.S. Cl.
CPC ............. *H04N 5/3745* (2013.01); *H04N 5/355* (2013.01); *H04N 5/3741* (2013.01); *H04N 5/3742* (2013.01)

(58) Field of Classification Search
None
See application file for complete search history.

(56) References Cited

U.S. PATENT DOCUMENTS

| 2004/0251396 A1 | 12/2004 | Koyama |
| 2004/0252215 A1 | 12/2004 | Mori |
| 2010/0188541 A1 | 7/2010 | Mabuchi et al. |
| 2011/0316839 A1 | 12/2011 | Minowa et al. |

FOREIGN PATENT DOCUMENTS

| CN | 101292514 A | 10/2008 |
| JP | 2005-5911 A | 1/2005 |
| JP | 2012-10106 A | 1/2012 |

*Primary Examiner* — Twyler Haskins
*Assistant Examiner* — Angel L Garces-Rivera
(74) *Attorney, Agent, or Firm* — Canon USA, Inc., IP Division

(57) ABSTRACT

An image pickup apparatus includes a plurality of pixels. Each pixel includes a photoelectric conversion unit, an amplifying transistor, and a reset transistor. Each pixel is set into a selected state or a non-selected state according to a voltage supplied to an input node of an amplifying transistor via the reset transistor. A control unit controls the reset transistor to turn on or off by supplying a voltage to a control node of the reset transistor. More specifically, a first voltage is supplied to the control node of the reset transistor in the pixel at the selected state to control it in the off-state, and a second voltage is supplied to the control node of the reset transistor in the pixel at the non-selected state to control it to be in the off-state.

20 Claims, 7 Drawing Sheets

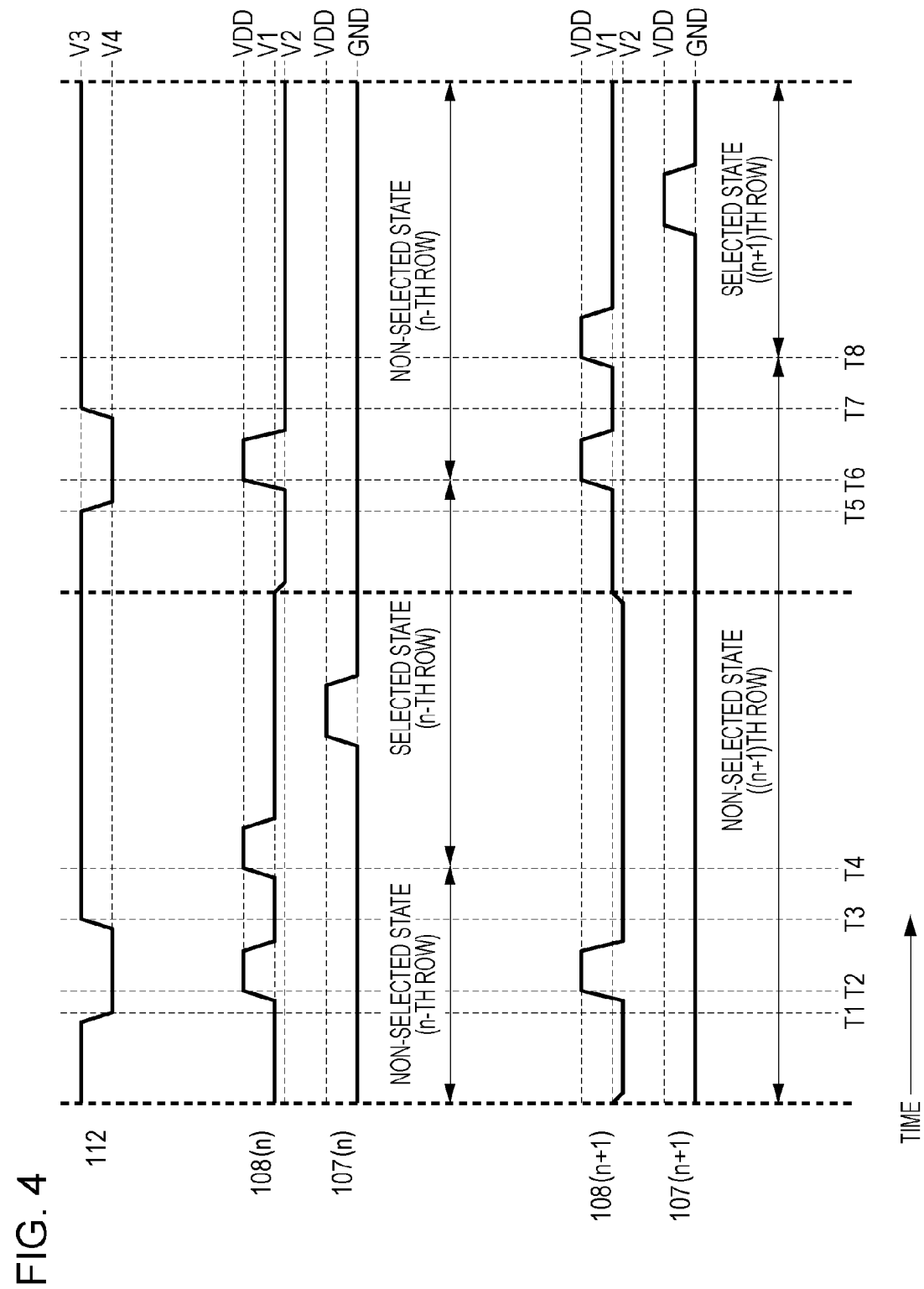

IMAGE PICKUP APPARATUS, METHOD OF DRIVING IMAGE PICKUP APPARATUS, AND IMAGE PICKUP SYSTEM

BACKGROUND OF THE INVENTION

1. Field of the Invention

Embodiments disclosed herein are related to an image pickup apparatus, a method of driving an image pickup apparatus, and an image pickup system.

2. Description of the Related Art

It is known to configure an image pickup apparatus such that a state of a pixel is switched between a selected state and a non-selected state by controlling a voltage applied to an input node of an amplifying transistor in the pixel.

Japanese Patent Laid-Open No. 2005-005911 discloses an image pickup apparatus including a plurality of pixels each including an amplifying transistor and a reset transistor. In each pixel, a gate (input node) of the amplifying transistor is connected to a source of the reset transistor, and a drain of the amplifying transistor is connected to a drain of the reset transistor. Furthermore, in each column in which a plurality of pixels are arranged, drains of reset transistors in respective pixels are connected together.

Japanese Patent Laid-Open No. 2005-005911 also discloses a technique of selecting a pixel. In this technique, drain of a reset transistor and a drain of an amplifying transistor are connected together in each pixel, and a pixel is selected by controlling a voltage applied to the commonly connected drains.

SUMMARY OF THE INVENTION

An embodiment according to an aspect of the present invention provides an image pickup apparatus. The image pickup apparatus of the embodiment includes a plurality of pixels. Each pixel includes a photoelectric conversion unit, an amplifying transistor configured to output a signal based on an electric charge generated in the photoelectric conversion unit, and an N-type reset transistor. Each pixel is configured to be set into a selected state or a non-selected state in response to a voltage supplied to an input node of the amplifying transistor via the reset transistor. The image pickup apparatus of the embodiment includes a control unit. The control unit is configured to control the reset transistor to be in an off-state, by supplying a first voltage to a control node of the reset transistor included in a pixel at the selected state of the pixels and supplying a second voltage lower than the first voltage to a control node of the reset transistor included in a pixel at the non-selected state of the pixels.

An embodiment according to another aspect of the present invention provides an image pickup apparatus. The image pickup apparatus includes a plurality of pixels. Each pixel includes a photoelectric conversion unit, an amplifying transistor configured to output a signal based on an electric charge generated in the photoelectric conversion unit, and a P-type reset transistor. Each pixels is configured to be set into a selected state or a non-selected state in response to a voltage supplied to an input node of the amplifying transistor via the reset transistor. The image pickup apparatus of the embodiment includes a control unit. The control unit is configured to control the reset transistor to be in an off-state, by supplying a first voltage to a control node of the reset transistor included in a pixel at the selected state of the pixels and supplying a second voltage higher than the first voltage to a control node of the reset transistor included in a pixel at the non-selected state of the pixels.

An embodiment according to another aspect of the present invention provides a method of driving an image pickup apparatus. The image pickup apparatus of the embodiment includes a plurality of pixels. Each pixel includes a photoelectric conversion unit, an amplifying transistor configured to output a signal based on an electric charge generated in the photoelectric conversion unit, and an N-type reset transistor. The method of the embodiment includes a step of setting a first part of the pixels into a selected state and a second part of the pixels into a non-selected state by supplying a voltage to an input node of the amplifying transistor via the reset transistor. The method of the embodiment includes a step of controlling the reset transistor included in a pixel at the selected state of the pixels to be in an off-state by supplying a first voltage to a control node of the reset transistor included in the pixel at the selected state. The method of the embodiment includes a step of controlling the reset transistor included in a pixel at the non-selected state of the pixels to be in an off-state by supplying a second voltage lower than the first voltage to a control node of the reset transistor included in the pixel at the non-selected state.

An embodiment according to another aspect of the present invention provides a method of driving an image pickup apparatus. The image pickup apparatus of the embodiment includes a plurality of pixels. Each pixel includes a photoelectric conversion unit, an amplifying transistor configured to output a signal based on an electric charge generated in the photoelectric conversion unit, and a P-type reset transistor. The method of the embodiment including a step of setting a first part of the pixels into a selected state and a second part of the pixels into a non-selected state by supplying a voltage to an input node of the amplifying transistor via the reset transistor. The method of the embodiment including a step of controlling the reset transistor included in a pixel at the selected state of the pixels to be in an off-state by supplying a first voltage to a control node of the reset transistor included in the pixel at the selected state. The method of the embodiment including a step of controlling the reset transistor included in a pixel at the non-selected state of the pixels to be in an off-state by supplying a second voltage higher than the first voltage to a control node of the reset transistor included in the pixel at the non-selected state.

Further features of the present invention will become apparent from the following description of exemplary embodiments with reference to the attached drawings.

BRIEF DESCRIPTION OF THE DRAWINGS

FIG. 4 is a diagram illustrating driving signals by which to drive an image pickup apparatus.

DESCRIPTION OF THE EMBODIMENTS

Figure 1:
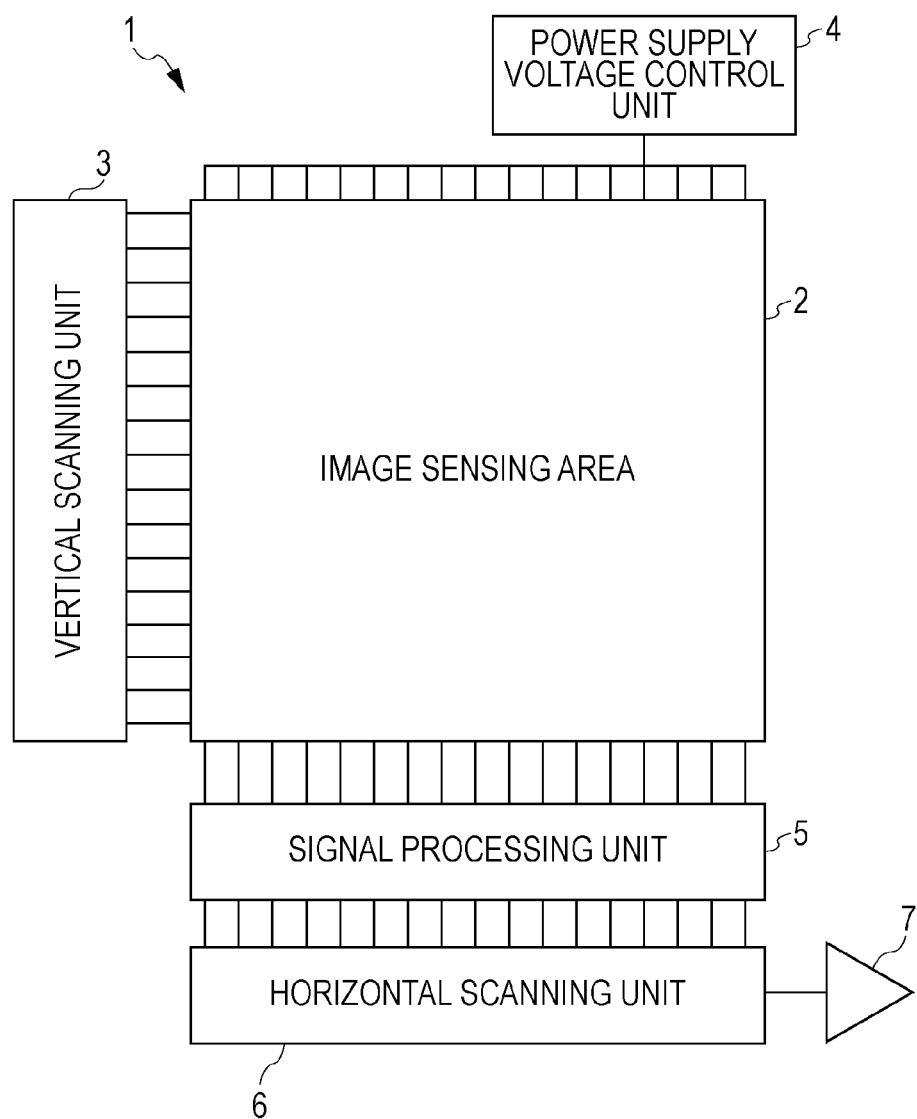
FIG. 1 is a schematic diagram illustrating a configuration of an image pickup apparatus.

According to embodiments, it is possible to suppress a reduction in a dynamic range.

In an image pickup apparatus configured such that a pixel is selected by controlling a voltage of an input node of an amplifying transistor, there is a possibility that when a change occurs in a voltage of an input node of an amplifying transistor of a pixel at the non-selected state, this change may cause a reduction in the dynamic range. Even when a reset transistor connected to the input node is in an off-state, there is a possibility that a voltage of the input node may be changed by a leakage current or a subthreshold current between a drain and source of the reset transistor.

In some image pickup apparatuses, a voltage of a source of a reset transistor of a non-selected pixel is lower than a voltage of a source of a reset transistor of a selected pixel because a gate of an amplifying transistor in the non-selected pixel is supplied with a voltage lower than a voltage supplied to a gate of an amplifying transistor in the selected pixel. Therefore, in the pixel at the non-selected state, when the voltage of the drain of the reset transistor is high, a voltage applied between the drain and the source of the reset transistor tends to become large. More specifically, to output a signal from the amplifying transistor, the voltage of the drain of the reset transistor is raised. When the voltage between the drain and the source of the reset transistor is large, this large voltage may cause an increase in the leakage current or the subthreshold current between the drain and the source even in the state in which the reset transistor is in the off-state, and thus a change may occur in the voltage of the input node of the amplifying transistor.

Even in a configuration in which a voltage of a drain of a reset transistor is not high in a non-selected pixel, the voltage of the drain of the reset transistor may be changed, for example, by noise such as a power surge.

In view of the above, embodiments provide an image pickup apparatus and a method of driving an image pickup apparatus, capable of suppressing a reduction in a dynamic range.

Embodiments of the invention are described in detail below with reference to drawings. Note that the embodiments are described below by way of example only and not limitation. Various modifications may be made to the embodiments without departing from the spirit and the scope of the invention. Any embodiment obtained by combining some part of one of the embodiments with another embodiment or by replacing some part of one of the embodiment with some part of another embodiment also falls within the scope of the invention.

First Embodiment

A first embodiment of the invention is described below. In this embodiment, a first voltage is supplied to a gate of a reset transistor in a selected pixel to control the reset transistor to be in an off-state, and a second voltage is supplied to a gate of a reset transistor in a non-selected pixel to control the reset transistor to be in an off-state, wherein the second voltage is set to be smaller than the first voltage such that the reset transistor in the non-selected pixel is more deeply turned off than the reset transistor in the selected pixel. In the following description of the present embodiment, it is assumed by way of example that signal charges are provided by electrons and transistors included in respective pixels are N-type MOS transistors.

FIG. 1 is a block diagram illustrating an image pickup apparatus 1 according to the present embodiment. The image pickup apparatus 1 may be constructed on a single chip using a semiconductor substrate. The image pickup apparatus 1 includes a plurality of pixels disposed in an image sensing area 2. The plurality of pixels may be arranged so as to form a pixel array.

The image pickup apparatus 1 also includes a vertical scanning unit 3, a power supply voltage control unit 4, a signal processing unit 5, a horizontal scanning unit 6, and an output unit 7. The vertical scanning unit 3 supplies driving signals to the plurality of pixels disposed in the image sensing area 2. The driving signals supplied from the vertical scanning unit 3 may be given to the pixels such that pixels in one row or pixels in a predetermined number of rows are given a driving signal at a time. The vertical scanning unit 3 may be realized using a shift register or an address decoder. The power supply voltage control unit 4 supplies a power supply voltage to the plurality of pixels disposed in the image sensing area 2. The signal processing unit 5 processes, in parallel, signals received from a plurality of pixels. The signal processing unit 5 includes a signal holding unit, a column amplifier, a noise reduction unit, an AD converter, and the like. The horizontal scanning unit 6 supplies driving signals for outputting signals from the signal processing unit 5 to the output unit 7. The horizontal scanning unit 6 may be realized using a shift register or an address decoder. The output unit 7 outputs the signals received from the signal processing unit 5 to the outside of the image pickup apparatus 1. The output unit 7 may include a buffer or an amplifier.

Figure 2:
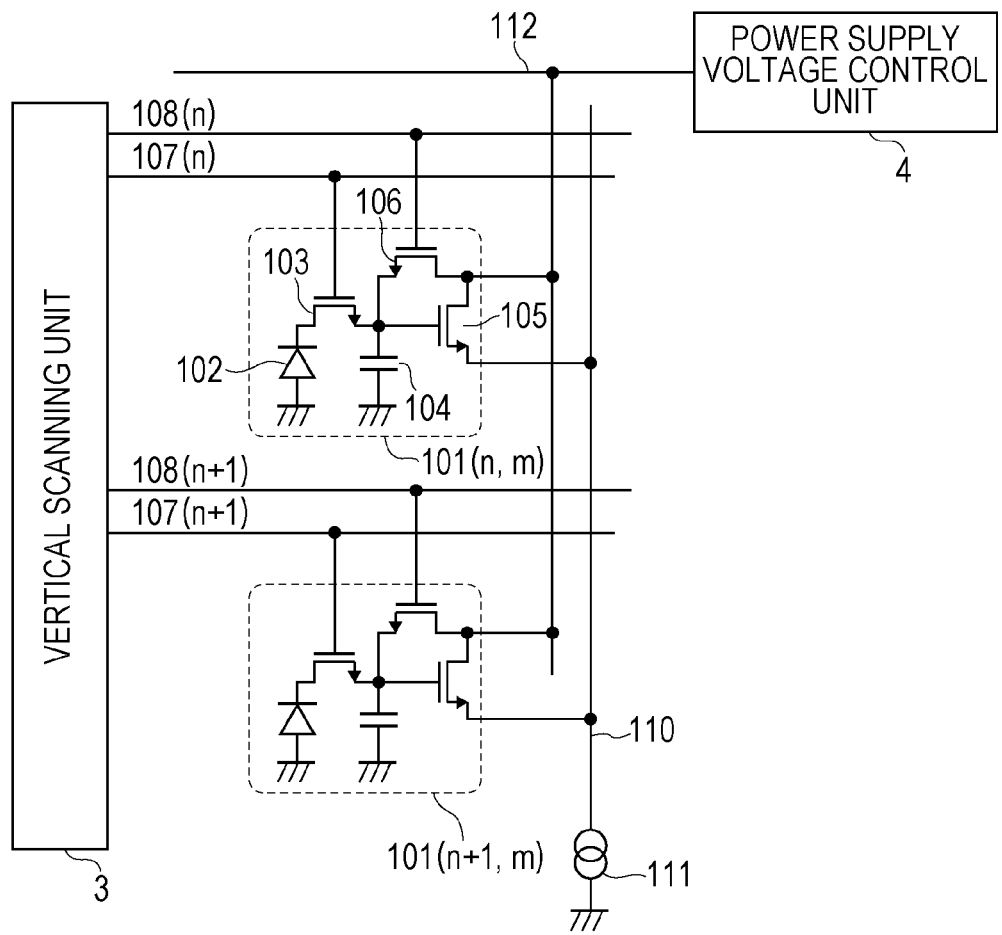
FIG. 2 is a diagram illustrating an equivalent circuit of an image pickup apparatus.

FIG. 2 illustrates an equivalent circuit of the image pickup apparatus according to the present embodiment. Although in FIG. 2, for simplicity, only two pixels are illustrated, the image pickup apparatus may actually include a greater number of pixels arranged two-dimensionally. In the present embodiment, the pixels are arranged in a matrix. In the example illustrated in FIG. 2, a pixel in an n-th row and in an m-th column and a pixel in an (n+1)th row and in the m-th column are illustrated. Each row includes a group of pixels that may be controlled in parallel by the vertical scanning unit. Each column includes a group of pixels arranged in a direction different from a direction in which each row extends. Pixels in each group in one column share one or a plurality of output lines. Note that the arrangement of the plurality of pixels is not limited to a matrix form, but pixels may be arranged one-dimensionally or two-dimensionally in the image sensing area 2.

Each pixel 101 includes a photoelectric conversion unit 102, a transfer transistor 103, a floating diffusion (FD) node 104, an amplifying transistor 105, and a reset transistor 106.

In the photoelectric conversion unit 102, a signal charge is generated by a photoelectric conversion. For example, a photodiode may be used as the photoelectric conversion unit 102. The photoelectric conversion unit 102 may accumulate the signal charge. The transfer transistor 103 transfers the signal charge from the photoelectric conversion unit 102 to the FD node 104. The electric charge transferred to the FD node 104 is converted to a voltage depending on capacitance of the FD node 104. The FD node 104 is electrically connected to a gate of the amplifying transistor 105. The amplifying transistor 105 outputs a signal based on the voltage of the gate to an output line 110. The amplifying transistor 105 forms a source follower together with a current source 111 electrically connected to the output line 110. The FD node 104 and the gate of the amplifying transistor 105 form an input node of the amplifying transistor 105. The reset transistor 106 supplies a voltage applied to a power supply line 112 to the input node of the amplifying transistor 105. That is, the reset transistor 106 resets the voltage of the input node of the amplifying transistor 105. Note that the transfer transistor 103 and the reset transistor 106 may be turned on in parallel thereby resetting the voltage of the photoelectric conversion unit 102.

Note that the transfer transistor 103 may or may not be provided as required. In a case where the transfer transistor 103 is not provided, the photoelectric conversion unit 102 may be directly connected to the FD node 104 and the gate of the amplifying transistor 105.

The reset transistor 106 may be of a depletion type. In this case, it is allowed to reset the voltage of the input node of the amplifying transistor 105 to a predetermined value regardless of a variation of a threshold value of the reset transistor 106.

A control line 107 is electrically connected to a gate of the transfer transistor 103. The transfer transistor 103 is controlled to be turned on or off by a driving signal supplied via the control line 107. A control line 108 is electrically connected to a gate of the reset transistor 106. The reset transistor 106 is controlled to be turned on or off by a driving signal supplied via the control line 108. The driving signals supplied via the control lines 107 and 108 are provided by the vertical scanning unit 3. That is, the vertical scanning unit 3 functions as a control unit that controls the reset transistor to turn on or off by controlling the voltage supplied to the gate of the reset transistor.

Note that the control line 107(*n*) is also electrically connected to gates of transfer transistors of other pixels (not illustrated) located in the n-th row and the control line 108(*n*) is also electrically connected to gates of reset transistors of other pixels located in the n-th row. Similarly, control lines 107(*n*+1) and 108(*n*+1) are respectively connected electrically to gates of transfer transistors and gates of reset transistors in pixels (not illustrated) in an (n+1)th row.

In the present embodiment, a plurality of pixels located in one column share one output line 110. That is, signals from pixels located in one column are output to the output line 110 that is used in common. In the present embodiment, although not illustrated in FIG. 2, the image pickup apparatus may include a plurality of output lines, and signals from a plurality of pixels located in one row may be output in parallel to the plurality of output lines.

Drains of amplifying transistors 105 and drains of reset transistors 106 in pixels located in one column are electrically connected together to the power supply line 112 which is electrically connected to the power supply voltage control unit 4. The power supply voltage control unit 4 provides a power supply voltage, which takes a plurality of values, to the power supply line 112. The plurality of values of the power supply voltage include, for example, a voltage V3 corresponding to a selected state of pixels and a voltage V4 corresponding to a non-selected state of pixels, as will be described later.

Next, a description is given below as to a method of selecting a pixel from a plurality of pixels to output a signal from the selected pixel according to the present embodiment. In the present embodiment, a voltage is supplied from the power supply voltage control unit 4 to the power supply line 112, and this voltage is further supplied via the reset transistor 106 to the input node of the amplifying transistor 105. When the voltage V3 corresponding to the selected state is supplied to the power supply line 112, if the reset transistor 106 is turned on, then the pixel 101 including this reset transistor 106 is set into the selected state. On the other hand, when the voltage V4 corresponding to the non-selected state is supplied to the power supply line 112, if the reset transistor 106 is turned on then the pixel 101 including this reset transistor 106 is set into the non-selected state. In other words, the selected state is a state that starts when the voltage V3 corresponding to the selected state is supplied to the input node of the amplifying transistor 105 of the pixel 101 and that ends immediately after the voltage V4 corresponding to the non-selected state is supplied to the input node of the amplifying transistor 105 of the pixel 101. The non-selected state is a state that starts when the voltage V4 corresponding to the non-selected state is supplied to the input node of the amplifying transistor 105 of the pixel 101 and that ends immediately after the voltage V3 corresponding to the selected state is supplied to the input node of the amplifying transistor 105 of the pixel 101.

In a case where the N-type amplifying transistor 105 forms a source follower as in the present embodiment, the voltage V3 corresponding to the selected state is set to be higher than the voltage V4 corresponding to the non-selected state. Furthermore, when the voltage V3 corresponding to the selected state and the voltage V4 corresponding to the non-selected state are set such that the voltage V3 is higher than the voltage V4 by an amount greater than a change in voltage at the FD node 104 that occurs when a saturated amount of charge is transferred from the photoelectric conversion unit 102 to the FD node 104, an improvement in dynamic range is achieved. For example, the voltage V3 corresponding to the selected state and the voltage V4 corresponding to the non-selected state may be set such that the difference between the voltage V3 and the voltage V4 is greater than a voltage equal to qN/C where N is a saturated number of electrons in the photoelectric conversion unit 102, C is the capacitance of the FD node 104, and q is the elementary charge.

In the present embodiment, the voltage supplied to the power supply line 112 is applied to the input node of the amplifying transistor 105 via the reset transistor 106. In the present embodiment, when the reset transistor 106 is turned on, the voltage of the input node of the amplifying transistor 105 may become equal to the voltage of the power supply line 112. However, in the present embodiment, a voltage drop across the reset transistor 106 may lead to a difference between the voltage of the power supply line 112 and the voltage of the input node of the amplifying transistor 105.

In the present embodiment, the power supply voltage control unit 4 supplies, to the power supply line 112, the voltages V3 and V4 respectively corresponding to the selected state and the non-selected state. That is, the power supply voltage control unit 4 is a part of a control unit that supplies the voltages V3 and V4 respectively corresponding to the selected state and the non-selected state to the drain of the reset transistor. Alternatively, another mechanism may be used to supply the voltages V3 and V4 respectively corresponding to the selected state and the non-selected state to the drain of the reset transistor.

Next, clipping of a signal output from a pixel is described below. It is possible to clip the signal output from the pixel by a voltage of the gate of the reset transistor 106 of the pixel at the selected state. The voltage of the gate of the reset transistor 106 may be set to a value that causes the reset transistor 106 to turn on when a particular amount of electric charge is transferred from the photoelectric conversion unit 102. More specifically, when the voltage between the gate of the reset transistor 106 and the FD node 104 becomes equal to or lower than the threshold voltage of the reset transistor 106, the reset transistor 106 turns on.

An alternative method is to clip the signal output from the pixel by a voltage of the input node of the amplifying transistor 105 of the pixel at the non-selected state. A still another method is to dispose a clipping circuit on the output line 110. The signal output from the pixel may be clipped using one of the methods described above.

Next, configurations of the vertical scanning unit 3 and the power supply voltage control unit 4 are described below. FIG.

3A illustrates an equivalent circuit of a part of the vertical scanning unit 3. In the circuit illustrated in FIG. 3A, a two-stage complementary metal-oxide semiconductor (CMOS) inverter circuit is disposed in an electrical path between a node 114 and the control line 108. Each one-stage CMOS inverter includes a first conductivity type transistor and a second conductivity type transistor. In the present embodiment, the first conductivity type is P type, and the second conductivity type is N type. A source of an N-type MOS transistor of the CMOS inverter whose drain is electrically connected to the control line 108 is selectively connected to a node that supplies a first voltage V1 or a node that supplies a second voltage V2. Either one of the nodes is selected according to a signal supplied to a node 115. A drain of a P-type MOS transistor and the drain of the N-type MOS transistor are electrically connected to each other and further to the control line 108. In the CMOS inverter, a source of the P-type MOS transistor whose drain is electrically connected to the control line 108 is electrically connected to a node via which a power supply voltage VDD is supplied.

Figure 3A:
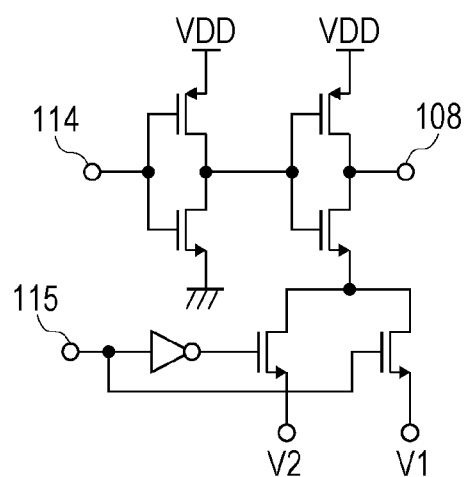
FIGS. 3A and 3B are diagrams illustrating equivalent circuits of an image pickup apparatus.

The vertical scanning unit 3 configured as illustrated in FIG. 3A is capable of supplying a driving signal that may take at least 3 values to the gate of the reset transistor 106. Note that the power supply voltage VDD corresponds to a value for turning on the reset transistor 106. The first voltage V1 and the second voltage V2 correspond to values for turning off the reset transistor 106. The second voltage V2 is lower than the first voltage V1.

The circuit illustrated in FIG. 3A is disposed periodically such that one circuit is disposed for each row or for every particular number of rows thereby allowing the vertical scanning unit 3 to supply the first voltage V1 to reset transistors 106 of pixels at the selected state, and second voltage V1 to reset transistors 106 of pixels at the non-selected state.

The first voltage V1 is a voltage for turning off reset transistors 106 of pixels at the selected state. In each pixel at the selected state, to output a signal based on an electric charge generated in the photoelectric conversion unit 102, the electric charge is transferred from the photoelectric conversion unit 102 to the FD node 104. In a case where the electric charge is provided by electrons, the transfer of the electric charge results in a reduction in the voltage of the FD node 104. To handle this situation, the first voltage V1 may be set to a value that controls the reset transistor 106 to remain in the off-state even in a state in which a saturated amount of charge is transferred to the FD node 104. Here, the saturated amount refers to a maximum amount of electric charge that the photoelectric conversion unit 102 is capable of accumulating. In a case where a signal is clipped in the pixel at the selected state as described above, the first voltage V1 may be set to a value that controls the reset transistor 106 to turn on when a particular amount of electric charge is transferred from the photoelectric conversion unit 102. Alternatively, to clip the signal, a voltage higher than the first voltage V1 may be selectively supplied to the gate of the reset transistor 106.

Figure 3B:
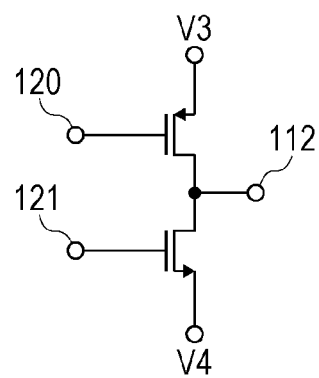

FIG. 3B illustrates an equivalent circuit of a part of the power supply voltage control unit 4. In the circuit illustrated in FIG. 3B, a P-type MOS transistor is disposed in an electrical path between the power supply line 112 and a node via which the voltage V3 corresponding to the selected state is provided, and an N-type MOS transistor is disposed in an electrical path between the power supply line 112 and a node via which a voltage V4 corresponding to the non-selected state is provided. The P-type MOS transistor and the N-type MOS transistor are respectively controlled by signals supplied to a node 120 and a node 121. The voltage V3 corresponding to the selected state is given, for example, by a power supply voltage. The voltage V4 corresponding to the non-selected state is given, for example, by a ground voltage.

The circuit illustrated in FIG. 3B is configured such that the P-type MOS transistor and the N-type MOS transistor are independently controllable. This makes it possible to control these two MOS transistors such that no overlapping occurs between a period in which one of the MOS transistors is in an on-state and a period in which the other one is in an on-state and between a transitional period in which a transition between the on-state and the off-state occurs in one of the respective MOS transistors and a transition period in which a transition occurs in the other one. Thus, it is possible to reduce power consumption caused by a shoot-through current compared with the CMOS inverter.

In the present embodiment, the circuit illustrated in FIG. 3B is disposed so as to be used in common by all pixels. Alternatively, the circuit illustrated in FIG. 3B may be disposed periodically such that one circuit is disposed for each column or for every particular number of columns.

Next, referring to a timing chart illustrated in FIG. 4, a method of driving the image pickup apparatus according to the present embodiment is described below. FIG. 4 illustrates a voltage supplied by the power supply voltage control unit 4 to the power supply line 112, and also illustrates driving signals supplied by the vertical scanning unit 3 to the control line 107 and the control line 108. In response to the driving signals illustrated in FIG. 4, the pixel 101 in the n-th row is first brought into the selected state and a signal is output. Thereafter, the pixel 101 in the (n+1)th row is brought into the selected state, and a signal is output.

First, at time T1, the voltage supplied by the power supply voltage control unit 4 to the power supply line 112 changes from the voltage V3 corresponding to the selected state to the voltage V4 corresponding to the non-selected state. Thereafter, at time T2, the driving signal supplied to the control line 108 for changes to the power supply voltage VDD for all rows. In response, the reset transistors 106 in all rows turn on. In this situation, the power supply line 112 is at the voltage V4 corresponding to the non-selected state, and thus all pixels are brought into the non-selected state.

Note that reset transistors may not be turned on for all pixels. For example, a reset transistor may not be turned into the non-selected state for a pixel to be next turned into the selected state (the pixel in the n-th row in the example illustrated in FIG. 4). Furthermore, for pixels that are already at the non-selected state, it is not necessary to again turn these pixels into the non-selected state.

When a predetermined time has elapsed since time T2, the second voltage V2 is supplied to the control line 108 of a pixel at the non-selected state (a pixel in (n+1)th row in the example illustrated in FIG. 4). In response, a reset transistor 106 of the pixel at the non-selected state turns off. Note that at this time, a reset transistor of a pixel to be next turned into the selected state may also be turned off or may be maintained in the on-state.

At time T3, the voltage supplied by the power supply voltage control unit 4 to the power supply line 112 changes from the voltage V4 corresponding to the non-selected state to the voltage V3 corresponding to the selected state. Thereafter, at time T4, the driving signal supplied to the control line 108 of the pixel in the n-th row changes to the power supply voltage VDD. In response, the reset transistor 106 of the pixel in the n-th row turns on. In this situation, the power supply line 112 is at the voltage V3 corresponding to the selected state, and thus the pixel in the n-th row is brought into the selected state.

In the state at time T3, the gate of the reset transistor 106 of the pixel at the non-selected state is at the second voltage V2. Furthermore, in the present embodiment, as illustrated in FIG. 2, drains of reset transistors in pixels located in each column are electrically connected to each other. That is, in a period in which the second voltage V2 is supplied to the gate of the reset transistor 106 in the pixel at the non-selected state, the voltage of the drain of this reset transistor 106 is changed from the voltage V4 corresponding to the non-selected state to the voltage V3 corresponding to the selected state. Furthermore, in at least a part of the period in which the second voltage V2 is supplied to the gate of the reset transistor 106 in the pixel at the non-selected state, and more particularly, after time T3 in this period, the voltage V3 corresponding to the selected state is supplied to the drain of the reset transistor 106 in the pixel at the non-selected state. In the present embodiment, at time T3, the voltage of the drain of the reset transistor 106 of the pixel at the non-selected state is increased, and this may cause an increase in a leakage current or a subthreshold current. Therefore, the advantageous effect of suppressing the reduction in the dynamic range is achieved more remarkably by deeply turning off the reset transistor 106 of the pixel at the non-selected state.

Note that also in a period in which the reset transistor 106 in the pixel at the non-selected state is in the off-state, when the voltage of the drain of this reset transistor 106 changes to a voltage other than the voltage V3 corresponding to the selected state, the leakage current or the subthreshold current may increase. That is, also in this case, a remarkable advantageous effect of suppressing the reduction in the dynamic range is achieved by deeply turning off the reset transistor 106 of the pixel at the non-selected state.

When a predetermined time has elapsed since time T4, the first voltage V1 is supplied to the control line 108 of the pixel at the selected state (and more specifically, the pixel in the n-th row in the example illustrated in FIG. 4). In response, the reset transistor 106 of the pixel at the selected state turns off.

In this situation, the second voltage V2 is lower than the first voltage V1, where the first voltage V2 is a voltage supplied to the gate of the reset transistor 106 in the pixel (in the n-th row) at the selected state to control this reset transistor 106 to be in the off-state, and the second voltage V2 is a voltage supplied to the gate of the reset transistor 106 in the pixel (in the (n+1)th row) at the non-selected state to control this reset transistor 106 in the off-state. Therefore, the reset transistor 106 of the pixel at the non-selected state is more deeply turned off than the reset transistor 106 of the pixel at the selected state is turned off. Note that in the pixel at the selected state, the voltage of the input node of the amplifying transistor is relatively high, and thus it is possible to control the reset transistor 106 to be in the off-state even when the first voltage V1 is high.

To control reset transistors 106 to be turned on, a voltage, and more specifically the power supply voltage VDD, is equally supplied to gates of reset transistors 106 in pixels in both stats, that is, the selected state and the non-selected state. Therefore, the third voltage (power supply voltage VDD), which is supplied to the gate of the reset transistor 106 in the pixel at the selected state to control this reset transistor 106 to be in the on-state, is different from the first voltage V1 by an amount smaller than an amount by which the fourth voltage (power supply voltage VDD), which is supplied to the gate of the reset transistor 106 in the pixel at the non-selected state to turn this reset transistor 106 in the on-state, is different from the second voltage V2. This makes it possible to reduce the change in the voltage of the gate of the reset transistor 106 in the pixel at the selected state. Thus it is possible to reduce a change in the voltage of the FD node 104 that may occur due to capacitive coupling between the FD node 104 the gate of the reset transistor 106. This allows a further increase in dynamic range.

Note that the voltage supplied to the gate of the reset transistor 106 to turn it on may be different between pixels at the selected state and pixels at the non-selected state. However, if the same voltage is used for both the selected state and the non-selected state, it is allowed to simplify the power supply voltage control unit 4, and thus it is possible to reduce the size of the image pickup apparatus.

After the reset transistor 106 in the pixel (in the n-th row) at the selected state turns off, a signal at the reset time is output, and the electric charge accumulated in the photoelectric conversion unit 102 is transferred, and then a signal based on the electric charge generated via the photoelectric conversion is output. Note that these operations may be performed using known techniques.

After the outputting of the signal is completed, all pixels are again brought into the non-selected state, and then the pixel in the (n+1)th row is brought into the selected state. These operation are performed according to driving signals provided in a period from time T5. Operations from time T5 to time T8 are similar to those from time T1 to time T4, and thus a further description thereof is omitted.

Figure 5:
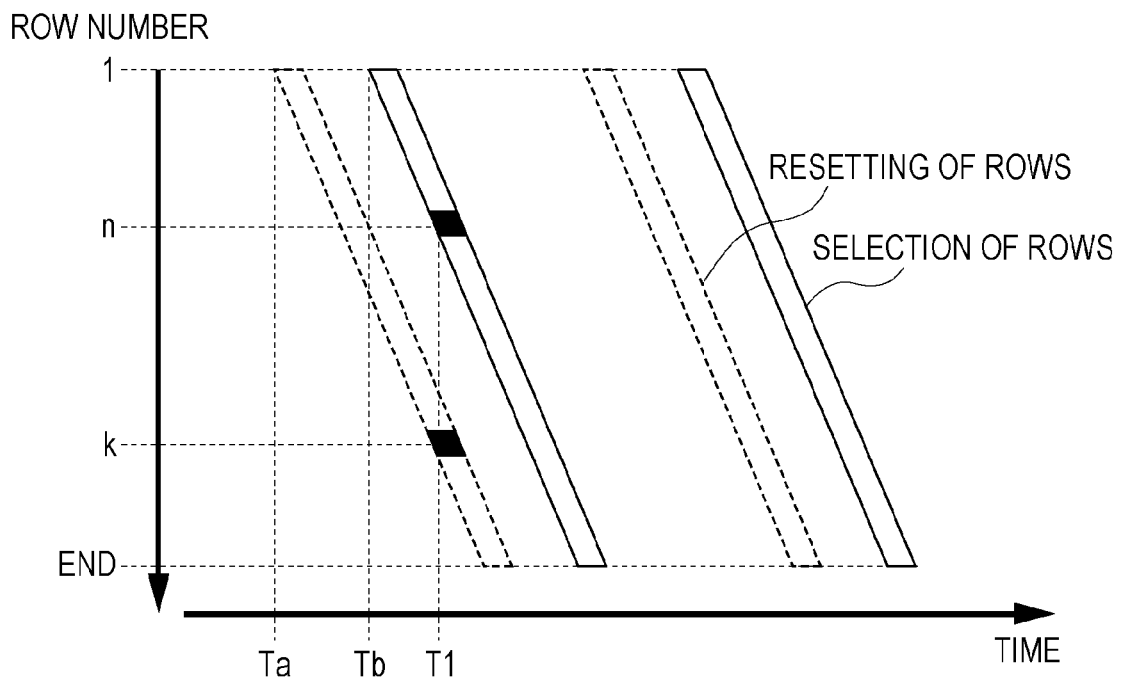
FIG. 5 is a diagram illustrating an operation of reading frames.

In the description given above with reference to FIG. 4, it is assumed that signals are read out from the pixel in the n-th row and the pixel in the (n+1)th row. However, in practice, signals are sequentially read out from all pixels disposed in the image sensing area 2. FIG. 5 schematically illustrates a manner in which signals are read out for two frames. First, at time Ta, a photoelectric conversion unit 102 of a pixel in a first row is reset. At this point of time, accumulation of an electric charge in the pixel in the first row is started. Thereafter, at time Tb, an operation of reading out a signal from the pixel in the first row is performed.

At time T1, an operation of reading out a pixel in n-th row is started. At this point of time, an operation of resetting a photoelectric conversion unit 102 of a pixel in a k-th row may be performed in parallel. In this case, before time T1 in FIG. 4, a transfer transistor 103 and a reset transistor 106 are turned on to reset the photoelectric conversion unit 102. Note that the resetting of the photoelectric conversion unit 102 is performed in a state in which the voltage V3 corresponding to the selected state is supplied to the power supply line 112.

In the present embodiment, as described above, the second voltage is lower than the first voltage, where the first voltage is a voltage supplied to the gate of the reset transistor in the pixel at the selected state to control this reset transistor to be in the off-state, while the second voltage is a voltage supplied to the gate of the reset transistor in the pixel at the non-selected state to control this reset transistor to be in the off-state. The setting of the first and second voltages in this manner makes it possible to more deeply turn off the reset transistor in the pixel at the non-selected state and thus it becomes possible to reduce the change in voltage of the input node of the amplifying transistor of the pixel at the non-selected state. Therefore, it is possible to suppress the reduction in the dynamic range.

In the embodiment described above, it is assumed by way of example that transistors are MOS transistors. Each MOS transistor includes a gate that is a control node, and a drain and a source that are two main nodes. Alternatively, other types of transistors may be used. For example, bipolar transistors may be used. In this case, the gate, the drain, and the source of each MOS transistor may be read as a based, an emitter, and a collector.

Second Embodiment

A second embodiment is described below. The second embodiment is different from the first embodiment in that when a signal is output from a pixel, a voltage of a drain of an amplifying transistor is raised. Because of this, in a pixel at the non-selected state, a voltage between a drain and source of a reset transistor tends to increase. In such a situation, the advantageous effect achieved by deeply turning off the reset transistor is more remarkable. The following description will focus on differences from the first embodiment, and a description of similar elements is omitted.

An image pickup apparatus according to the present embodiment has a similar overall configuration to that according to the first embodiment, and thus the block diagram of FIG. 1 also illustrates the overall configuration of the image pickup apparatus of the present embodiment. Furthermore, pixels of the image pickup apparatus according to the present embodiment have a similar equivalent circuit to that according to the first embodiment, and thus FIG. 2 also illustrates the equivalent circuit of the pixels of the image pickup apparatus according to the present embodiment. A vertical scanning unit 3 according to the present embodiment is similar to that according to the first embodiment, and thus FIG. 3A illustrates an equivalent circuit of a part of the vertical scanning unit 3. A further description of these similar configurations is omitted.

Figure 6:
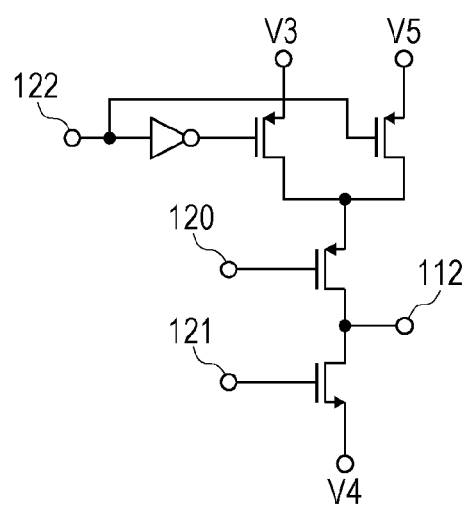
FIG. 6 is a diagram illustrating an equivalent circuit of an image pickup apparatus.

A configuration of a power supply voltage control unit 4 according to the present embodiment is described below. FIG. 6 illustrates an equivalent circuit of a part of the power supply voltage control unit 4. In FIG. 6, parts having similar functions to those in FIG. 3B are denoted by similar reference numerals, and a further description thereof is omitted.

In the circuit illustrated in FIG. 6, a source of a P-type MOS transistor is selectively connected to a node via which a voltage V3 corresponding to the selected state is supplied or a node via which a power supply voltage V5 is supplied when a signal is output. A signal supplied to a node 122 controls which node is selected. The power supply voltage V5 is higher than the voltage V3 corresponding to the selected state.

When the reset transistor 106 is turned on in a situation in which the power supply voltage V5 is supplied to the power supply line 112, a pixel including this reset transistor 106 is set into the selected state. That is, the power supply voltage V5 may be one of voltages corresponding to the selected state.

The power supply voltage control unit 4 configured as illustrated in FIG. 6 is capable of supplying a power supply voltage that takes at least three values. In the present embodiment, the circuit illustrated in FIG. 6 is disposed so as to be used in common by all pixels. Alternatively, the circuit illustrated in FIG. 6 may be disposed periodically such that one circuit is disposed for each column or for every particular number of columns.

Figure 7:
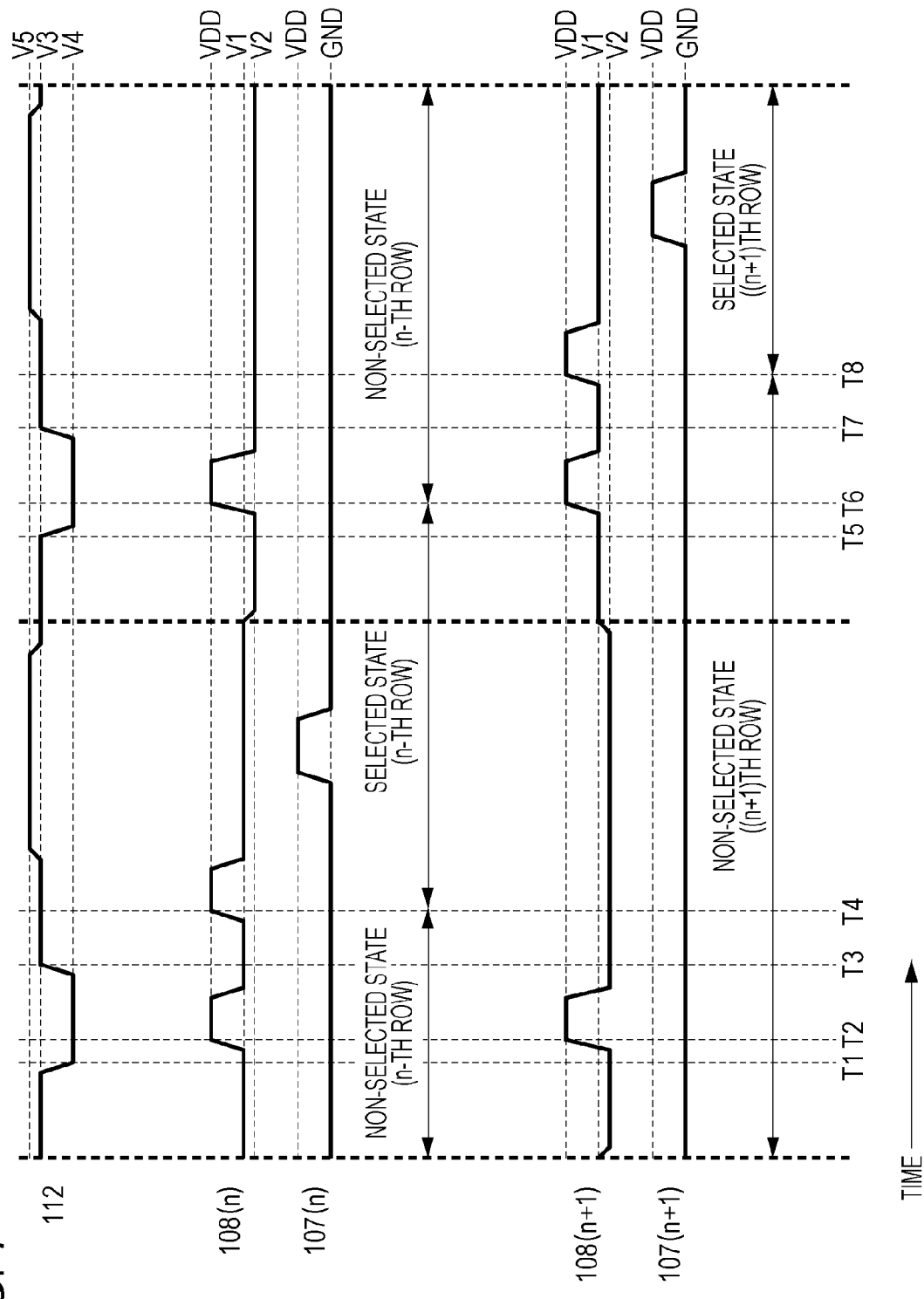
FIG. 7 is a diagram illustrating driving signals by which to drive an image pickup apparatus.

Next, referring to a timing chart illustrated in FIG. 7, a method of driving the image pickup apparatus according to the present embodiment is described below. In FIG. 7, similar parts to those of the first embodiment illustrated in FIG. 4 are denoted by similar reference symbols, and a further description thereof is omitted.

In the present embodiment, the power supply voltage V5 is supplied to the power supply line 112 when a signal at the rest time is output, and an electric charge accumulated in the photoelectric conversion unit 102 is transferred and then a signal based on the electric charge generated via the photoelectric conversion is output. This results in an increase in the voltage of the drain of the amplifying transistor, and thus the dynamic range is expanded.

In the present embodiment, as described above, when a signal is output from a pixel, a voltage of a drain of an amplifying transistor in this pixel is raised. As a result, in pixels at the non-selected state, an increase occurs in a voltage between a drain and a source of a reset transistor. In such a situation, the advantageous effect achieved by deeply turning off the reset transistor is more remarkable.

Third Embodiment

A third embodiment is described below. In the first embodiment and the second embodiment described above, it is assumed that signal charges are provided by electrons, and transistors in each pixel are N-type MOS transistors. Instead, in the present embodiment, signal charges are provided by holes, and P-type MOS transistors are used as transistors in each pixel.

Note that in the present embodiment, the conductivity types of all transistors are opposite to those in the first and second embodiments, and accordingly relative values of voltages are also opposite. More specifically, the reset transistor 106 is realized by a P-type MOS transistor. Regarding to the first voltage V1 that controls the reset transistor 106 in each pixel at the selected state to be turned off and the second voltage V2 that controls the reset transistor 106 in each pixel at the non-selected state to be turned off, the second voltage V2 is set to be higher than the first voltage V1. The other elements in the present embodiment are similar to those according to the first embodiment and the second embodiment, and thus a further description thereof is omitted.

The present embodiment provides advantageous effect similar to those provided by the first or second embodiment.

Fourth Embodiment

Figure 8:
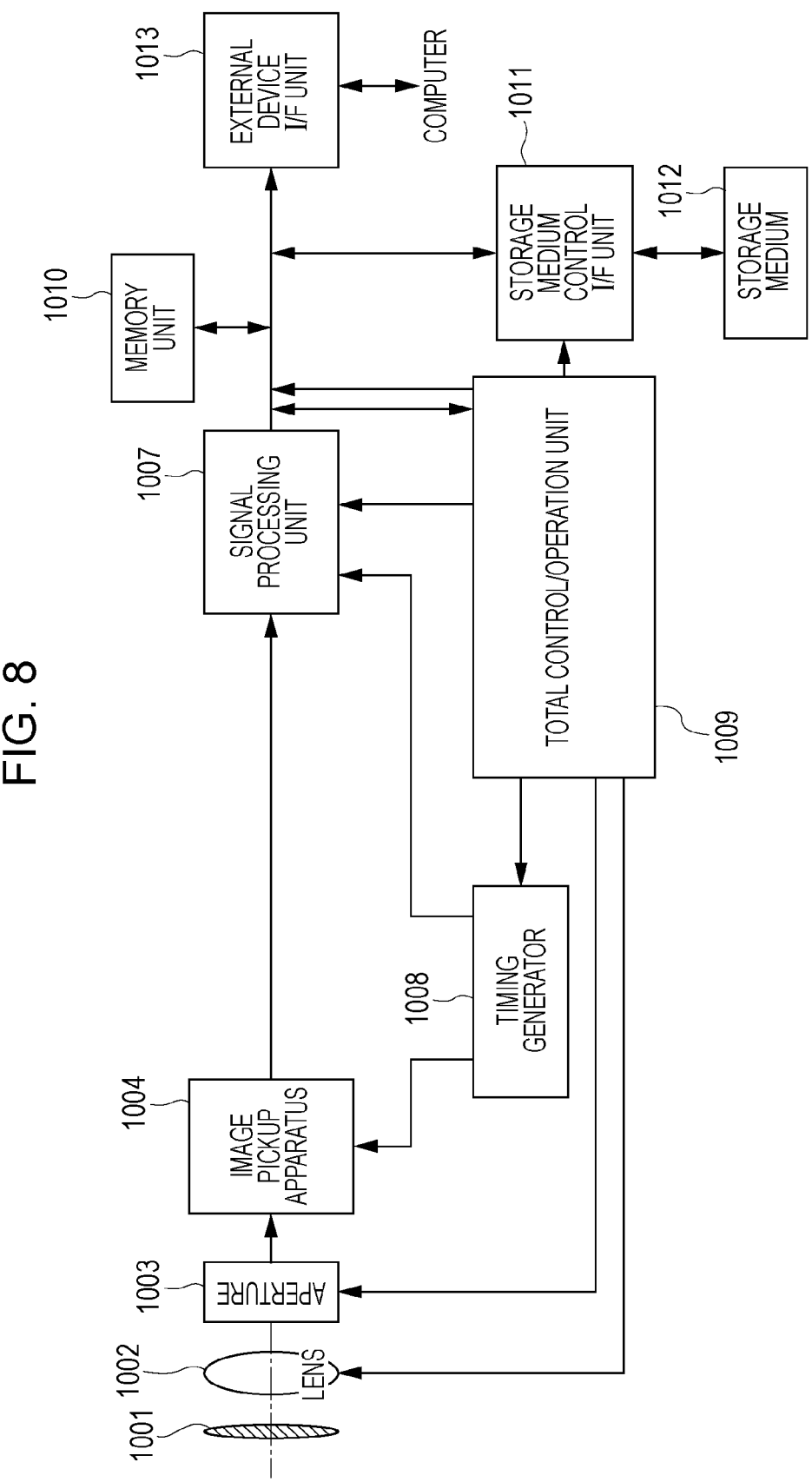
FIG. 8 is a block diagram illustrating an image pickup system according to an embodiment.

An image pickup system according to an embodiment is described. The image pickup system may be a digital still camera, a digital camcorder, a copying machine, a facsimile machine, a portable telephone, an in-vehicle camera, an observation satellite, or the like. FIG. 8 is a block diagram illustrating a digital still camera that is an example of image pickup system according to the present embodiment.

In FIG. 8, reference numeral 1001 denotes a barrier for protecting a lens, reference numeral 1002 denotes the lens configured to form an optical image of an object on an image pickup apparatus 1004, and reference numeral 1003 denotes an aperture configured to vary the light quantity after passing through the lens 1002. The image pickup apparatus 1004 may be an image pickup apparatus according to one of the embodiments described above. The image pickup apparatus 1004 converts the optical image formed via the lens 1002 into image data. The image pickup apparatus 1004 includes an AD converter formed on a semiconductor substrate of the image pickup apparatus 1004. Reference numeral 1007 denotes a signal processing unit configured to perform signal processing including various correction processes, a data compression process, and the like on the image data output from the image pickup apparatus 1004. Furthermore, in FIG. 8, reference numeral 1008 denotes a timing generator configured to output various timing signals to the image pickup apparatus 1004 and the signal processing unit 1007. Reference numeral 1009 denotes a total control/operation unit configured to a total control/operation unit configured to control the whole digital still camera. Reference numeral 1010 denotes a memory unit (frame memory) configured to temporarily store image data. Reference numeral 1011 denotes an interface unit (storage medium control I/F unit) via which to store or read data into or from a storage medium. Reference numeral 1012 denotes a removable storage medium such as a semiconductor memory or the like used to store or read image data. Reference numeral 1013 denotes an interface unit (external device I/F unit) via which to communicate with an external computer or the like. The timing signals or the like may be input from the outside of the image pickup system, and thus the image pickup system may include at least the image pickup apparatus 1004 and the signal processing unit 1007 that processes an image signal output from the image pickup apparatus 1004.

In the example described above, the image pickup apparatus 1004 and the AD converter are formed on the same semiconductor substrate. Alternatively, the image pickup apparatus 1004 and the AD converter may be formed on different semiconductor substrates. In an alternative example, the image pickup apparatus 1004 and the signal processing unit 1007 may be formed on the same substrate.

In the present embodiment, the image pickup apparatus according to one of the first to third embodiments is employed as the image pickup apparatus 1004 thereby achieving the image pickup system capable of suppressing a reduction in dynamic range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-209492, filed Sep. 24, 2012, which is hereby incorporated by reference herein in its entirety.

What is claimed is:

1. An image pickup apparatus comprising:
   a plurality of pixels each including a photoelectric conversion unit, an amplifying transistor configured to output a signal based on an electric charge generated in the photoelectric conversion unit, and an N-type reset transistor, each of the plurality of pixels being configured to be set into a selected state or a non-selected state in response to a voltage supplied to an input node of the amplifying transistor via the reset transistor; and
   a control unit configured to control the reset transistor to be in an off-state, by supplying a first voltage to a control node of the reset transistor included in a pixel at the selected state of the plurality of pixels and supplying a second voltage lower than the first voltage to a control node of the reset transistor included in a pixel at the non-selected state of the plurality of pixels.

2. An image pickup apparatus comprising:
   a plurality of pixels each including a photoelectric conversion unit, an amplifying transistor configured to output a signal based on an electric charge generated in the photoelectric conversion unit, and a P-type reset transistor, each of the plurality of pixels being configured to be set into a selected state or a non-selected state in response to a voltage supplied to an input node of the amplifying transistor via the reset transistor; and
   a control unit configured to control the reset transistor to be in an off-state, by supplying a first voltage to a control node of the reset transistor included in a pixel at the selected state of the plurality of pixels and supplying a second voltage higher than the first voltage to a control node of the reset transistor included in a pixel at the non-selected state of the plurality of pixels.

3. The image pickup apparatus according to claim 1, wherein
   a first main node of the reset transistor is electrically connected to the control unit,
   a second main node of the reset transistor is electrically connected to the input node of the amplifying transistor, and
   the control unit is configured to supply a voltage corresponding to the selected state to the first main node of the reset transistor included in the pixel at the non-selected state upon supplying the second voltage to the control node of the reset transistor included in the pixel at the non-selected state.

4. The image pickup apparatus according to claim 3, wherein the control unit is configured to change a voltage supplied to the first main node of the reset transistor included in the pixel at the non-selected state from a voltage corresponding to the non-selected state to the voltage corresponding to the selected state, upon supplying the second voltage to the control node of the reset transistor included in the pixel at the non-selected state.

5. The image pickup apparatus according to claim 3, wherein the control unit is configured to control, upon supplying the second voltage and the voltage corresponding to the selected state respectively to the control node and the first main node of the reset transistor included in the pixel at the non-selected state, the reset transistor included in a different pixel of the plurality of pixels to be in an on-state thereby setting the different pixel into the selected state.

6. The image pickup apparatus according to claim 3, wherein
   the plurality of pixels includes a first group of pixels and a second group of pixels, the first group of pixels being configured such that the control node of the reset transistor in each pixel of the first group of pixels is electrically connected to a first common line, the second group of pixels being configured such that the first main node of the reset transistor in each pixel of the second group of pixels is electrically connected to a second common line, and
   at least part of pixels in the first group of pixels are not included in the second group of pixels.

7. The image pickup apparatus according to claim 6, further comprising a plurality of output lines, wherein
   signals from the first group of pixels are to be output in parallel to the plurality of output lines, and
   signals from the second group of pixels are to be sequentially output to one of the plurality of output lines.

8. The image pickup apparatus according to claim 3, wherein the first main node of the reset transistor and a main node of the amplifying transistor are connected to each other.

9. The image pickup apparatus according to claim 1, wherein
   the amplifying transistor has a same conductivity type as a conductivity type of the reset transistor,
   the control unit is configured to control the reset transistor included in the pixel at the selected state to be in an on-state by supplying, to the control node of the reset transistor included in the pixel at the selected state, a third voltage different from the first voltage by a first amount,
   the control unit is configured to control the reset transistor included in the pixel at the non-selected state to be in an on-state by supplying, to the control node of the reset transistor included in the pixel at the non-selected state, a fourth voltage different from the second voltage by a second amount, and
   the first amount is smaller than the second amount.

10. The image pickup apparatus according to claim 1, wherein a voltage supplied by the control unit to the control node of the reset transistor included in the pixel at the selected state to control the reset transistor to be in an on-state is equal to a voltage supplied by the control unit to the control node of the reset transistor included in the pixel at the non-selected state to control the reset transistor to be in an on-state.

11. The image pickup apparatus according to claim 1, wherein
the control unit includes a first-conductivity-type MOS transistor and a second-conductivity-type MOS transistor,
a source of the first-conductivity-type MOS transistor is electrically connected to a node to which a voltage is supplied to control the reset transistor to be in an on-state,
a drain of the first-conductivity-type MOS transistor and a drain of the second-conductivity-type MOS transistor are electrically connected to the control node of the reset transistor, and
a source of the second-conductivity-type MOS transistor is selectively connected to a node to which the first voltage is supplied or a node to which the second voltage is supplied.

12. An image pickup system comprising:
the image pickup apparatus according to claim 1; and
a signal processing apparatus configured to process a signal output from the image pickup apparatus.

13. A method of driving an image pickup apparatus, the image pickup apparatus including a plurality of pixels each including a photoelectric conversion unit, an amplifying transistor configured to output a signal based on an electric charge generated in the photoelectric conversion unit, and an N-type reset transistor, the method comprising:
setting a first part of the plurality of pixels into a selected state and a second part of the plurality of pixels into a non-selected state by supplying a voltage to an input node of the amplifying transistor via the reset transistor;
controlling the reset transistor included in a pixel at the selected state of the plurality of pixels to be in an off-state by supplying a first voltage to a control node of the reset transistor included in the pixel at the selected state; and
controlling the reset transistor included in a pixel at the non-selected state of the plurality of pixels to be in an off-state by supplying a second voltage lower than the first voltage to a control node of the reset transistor included in the pixel at the non-selected state.

14. A method of driving an image pickup apparatus, the image pickup apparatus including a plurality of pixels each including a photoelectric conversion unit, an amplifying transistor configured to output a signal based on an electric charge generated in the photoelectric conversion unit, and a P-type reset transistor, the method comprising:
setting a first part of the plurality of pixels into a selected state and a second part of the plurality of pixels into a non-selected state by supplying a voltage to an input node of the amplifying transistor via the reset transistor;
controlling the reset transistor included in a pixel at the selected state of the plurality of pixels to be in an off-state by supplying a first voltage to a control node of the reset transistor included in the pixel at the selected state; and
controlling the reset transistor included in a pixel at the non-selected state of the plurality of pixels to be in an off-state by supplying a second voltage higher than the first voltage to a control node of the reset transistor included in the pixel at the non-selected state.

15. The method of driving the image pickup apparatus according to claim 13, further comprising supplying a voltage corresponding to the selected state to a main node of the reset transistor included in the pixel at the non-selected state upon supplying the second voltage to the control node of the reset transistor included in the pixel at the non-selected state.

16. The method of driving the image pickup apparatus according to claim 15, further comprising changing a voltage supplied to the main node of the reset transistor included in the pixel at the non-selected state from a voltage corresponding to the non-selected state to the voltage corresponding to the selected state, upon supplying the second voltage to the control node of the reset transistor included in the pixel at the non-selected state.

17. The method of driving the image pickup apparatus according to claim 15, further comprising controlling, upon supplying the second voltage and the voltage corresponding to the selected state respectively to the control node and the main node of the reset transistor included in the pixel at the non-selected state, the reset transistor included in a different pixel of the plurality pixels to be in an on-state thereby setting the different pixel into the selected state.

18. The method of driving the image pickup apparatus according to claim 15, wherein
the image pickup apparatus further includes a plurality of output lines, and
the plurality of pixels includes a first group of pixels and a second group of pixels, the first group of pixels being configured such that the control node of the reset transistor in each pixel of the first group of pixels is electrically connected to a first common line, the second group of pixels being configured such that the main node of the reset transistor in each pixel of the second group of pixels is electrically connected to a second common line, the method further comprising:
outputting signals from the first group of pixels in parallel to the plurality of output lines; and
outputting signals from the second group of pixels sequentially to one of the plurality of output lines.

19. The method of driving the image pickup apparatus according to claim 13, further comprising:
turning on the reset transistor by supplying a third voltage to the control node of the reset transistor, wherein
a difference between the third voltage and the first voltage is smaller than a difference between the third voltage and the second voltage.

20. The method of driving the image pickup apparatus according to claim 13, wherein a voltage supplied to the control node of the reset transistor included in the pixel at the selected state to control the reset transistor to be in an on-state is equal to a voltage supplied to the control node of the reset transistor included in the pixel at the non-selected state to control the reset transistor to be in an on-state.

* * * * *